Oct. 14, 1969　　　　　N. J. RENDLER　　　　　3,471,935

PORTABLE-PRECISION HOLE LOCATING AND MILLING GUIDE

Filed March 31, 1967　　　　　　　　　　　　3 Sheets-Sheet 1

INVENTOR
NORBERT J. RENDLER

BY　　　　　　AGENT

ATTORNEY

Oct. 14, 1969 N. J. RENDLER 3,471,935
PORTABLE-PRECISION HOLE LOCATING AND MILLING GUIDE
Filed March 31, 1967 3 Sheets-Sheet 2

INVENTOR
NORBERT J. RENDLER

BY *Melvin L. Crane* AGENT
*[signature]* ATTORNEY

Oct. 14, 1969            N. J. RENDLER           3,471,935
PORTABLE-PRECISION HOLE LOCATING AND MILLING GUIDE
Filed March 31, 1967                          3 Sheets-Sheet 3
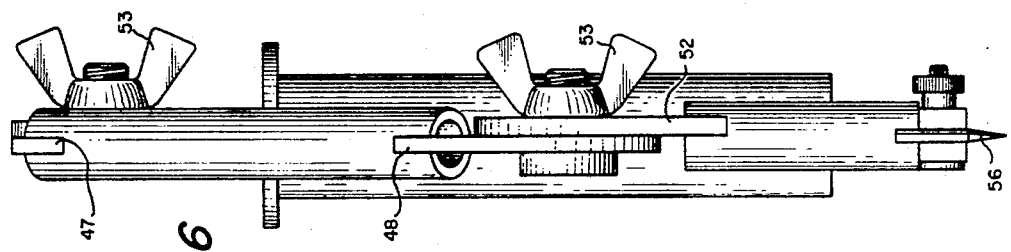
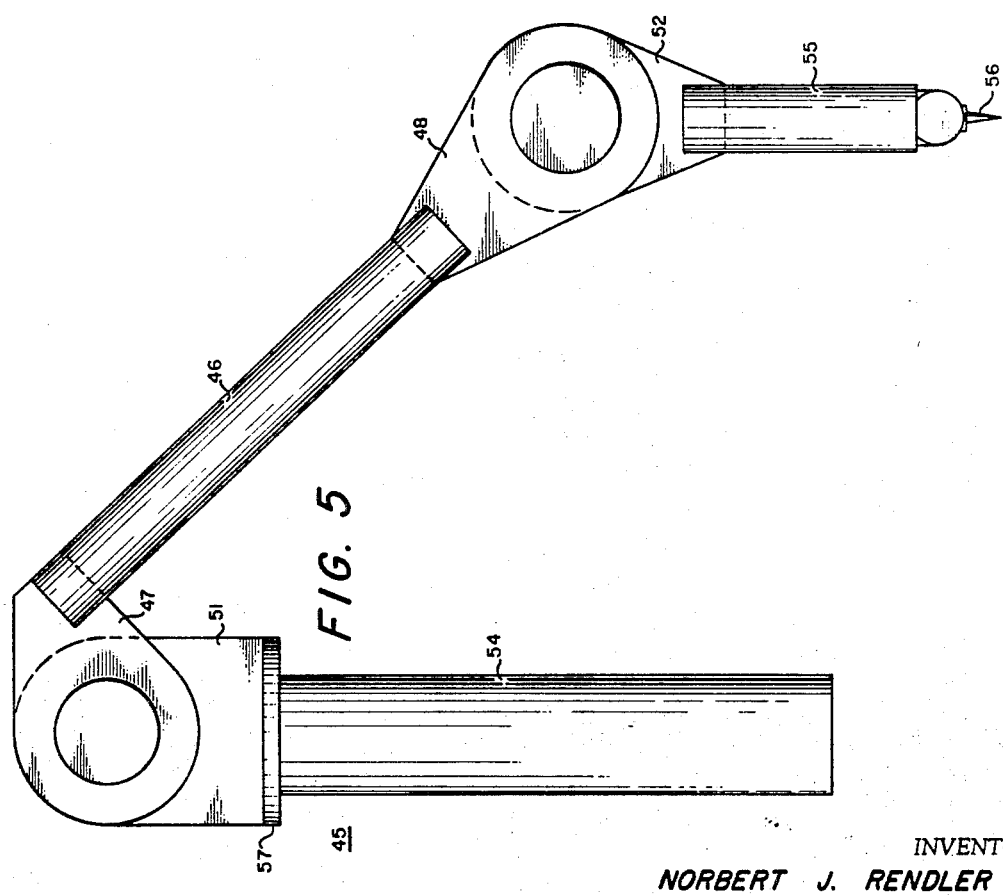
INVENTOR
NORBERT J. RENDLER
BY *Melvin L. Crane* AGENT
*R. Sciascia* ATTORNEY

United States Patent Office 3,471,935
Patented Oct. 14, 1969

---

3,471,935
PORTABLE-PRECISION HOLE LOCATING AND MILLING GUIDE
Norbert J. Rendler, Accokeek, Md., assignor to the United States of America as represented by the Secretary of the Navy
Filed Mar. 31, 1967, Ser. No. 628,241
Int. Cl. B27g 23/00
U.S. Cl. 33—185    7 Claims

ABSTRACT OF THE DISCLOSURE

This disclosure is directed to a portable-precision hole locating and milling guide which will locate the center of a milling cutter or drill within 0.001 inch of a proposed hole center. The device includes a housing supported by equiangularly spaced swivel feet within which an adjustable guide or barrel is adjustable coaxial therewith. The barrel is used to mount other basic instruments such as a microscope, alignment units, a milling bar, drill, or any other such device. The barrel is adjustable in the sidewise direction normal to the axis by suitable oppositely disposed adjustment screws positioned at 90 degrees relative to each other. The swivel feet of the device are made with flat surfaces for securing the device to any desired structure by use of a quick setting cement.

---

The invention described herein may be manufactured and used by or for the Government of the United States of America for governmental purposes without the payment of any royalties thereon or therefor.

BACKGROUND OF THE INVENTION

This device is directed to a hole locating and milling guide and more particularly to a hole locating and milling device which may be secured to flat or curved surfaces to angularly position the axis of the device normal to the surface to provide an angle of operation normal to the structural surface at the proposed hole center.

Heretofore various methods, techniques, and instruments have been devised to locate and guide cutting tools which will drill or mill holes in structures wherein portable equipment is necessary for field operations. One such portable hole drilling device depends upon electro magnetic flats to hold the device in place. This device is aligned with the proposed hole to be drilled by use of a magnifying glass with cross hairs wherein the device is moved by hand. This device does not provide any horizontal adjusting means for accuracy of alignment. The device is also limited to smooth, flat surfaces without any irregularities. Another such device is a drilling guide which is provided with adjustable clamps to hold the guide in position on the structure. This device only has vertical movement and is aligned by hand without any fine adjustment. Other hole drilling devices may be fastened to the structure with screws or bolts. This method is expensive with respect to man hours employed in mounting the device and in repairing the damage to the structure after completion of the drilling operation. Also, the structural damage is objectionable and sometimes prohibited. The known devices heretofore used do not provide accurate precision maneuverability of the drill guide wherein the devices may be accurately aligned over the hole to be drilled and also fastened to the surface without damage to the surface.

BRIEF SUMMARY OF THE INVENTION

The present invention is directed to a portable-precision hole-locating and milling guide which will permit one to locate the center of a milling cutter over a desired hole center. The device is provided with adjustable feet which adjust the angle of the barrel guide which is used for locating the hole and for guiding the milling cutter or drill. The device is also provided with adjustable means secured relative to the guide such that the guide may be adjusted horizontally for fine adjustment. The feet of the device are made such that they may be secured to the surface by use of quick setting cement and then the device may be adjusted relative to the surface in order to align the milling guide normal to the surface. The barrel or guide of the device is made such that the guide will support different accessories to be used with the device. Such accessories include a microscope for aligning the device with the desired hole, different alignment units, and the milling bar assembly or drill which is guided by the guide.

It is therefore an object of the present invention to provide a portable-precision hole locating or milling guide which will accurately locate the center of the guide such that a proposed hole may be accurately drilled.

Another object is to provide a device which may be used by unskilled workers as well as skilled workers.

Still another object is to provide a device which has both vertical and horizontal adjustment such that the device may be used on smooth or irregular surfaces to drill a hole normal to the surface thereof.

Yet another object is to provide a device which may be secured to the surface within which a hole is to be bored without damage to the surface.

The nature of this invention as well as the other objects and advantages thereof will be readily apparent from considerations of the following specification relating to the annexed drawing.

BRIEF DESCRIPTION OF THE DRAWINGS

FIG. 5 is an accessory for aligning the device on a curved surface;

FIG. 6 is a view of the device shown in FIG. 5 illustrating the parts thereof;

DETAILED DESCRIPTION OF THE INVENTION

Figure 1:
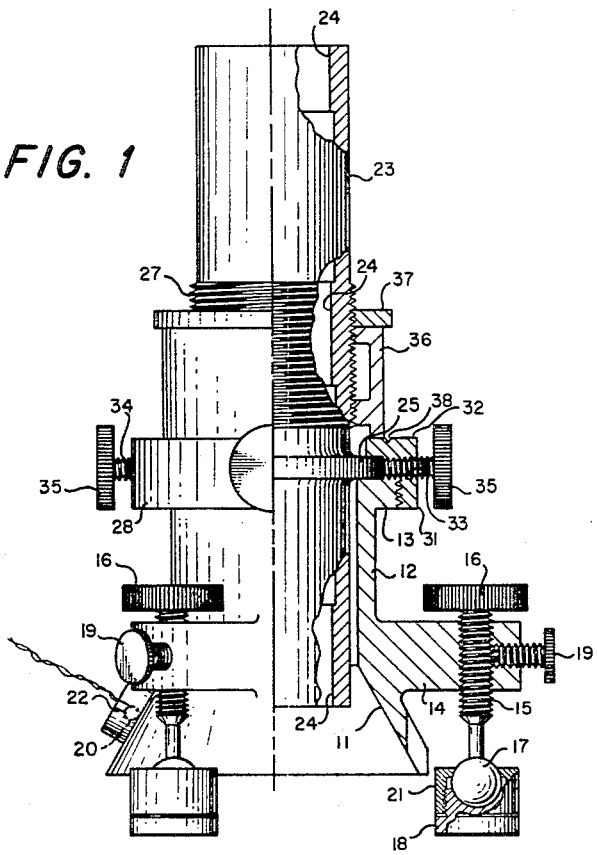
FIG. 1 is a side view of the device shown partially in cross section to illustrate the relative parts thereof.
Figure 2:
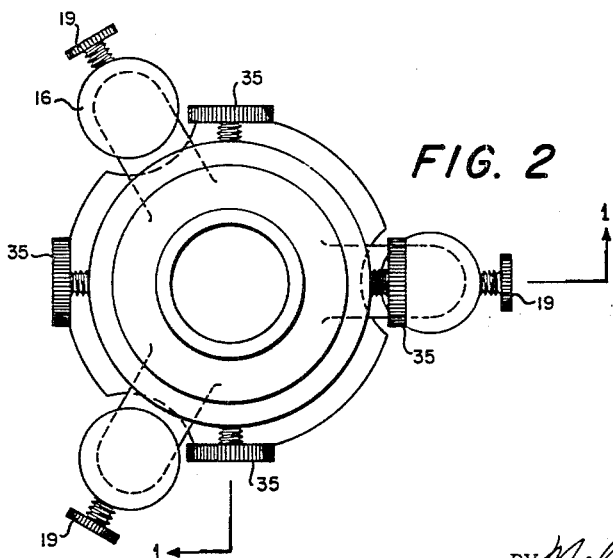
FIG. 2 is a top view which illustrates the relative parts.
Figure 3:
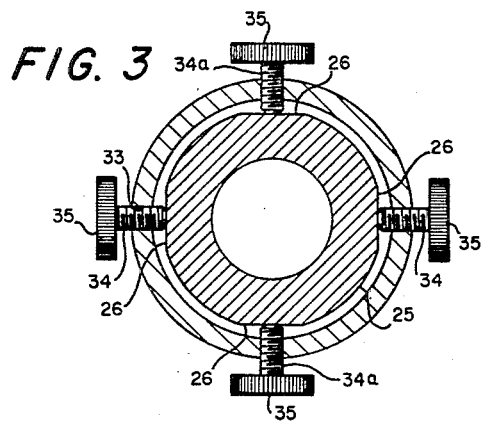
FIG. 3 is a cross sectional view through the adjusting means which illustrates the adjusting means for the barrel of the device.

Now referring to the drawings there is shown by illustration a preferred embodiment of the invention wherein like reference characters represent like parts throughout the specification. As shown, FIG. 1 is a side view of the device shown partially in cross section to illustrate the relationship of several of the various parts. As shown, the device includes a frame having a conical base 11 and a tubular cylindrical body 12 which has an outwardly extending rim 13 at the upper end of the frame. Three equiangularly space radial arms 14 spaced 120 degrees apart, project outwardly from the frame. Each of the radially extending arms are threaded vertically at points equi-distant from the frame center to receive a threaded adjusting member 15 which has a screw head 16 on one end thereof. The opopsite end of the threaded member 15 has secured thereto a spherically shaped member 17 about which a swivel foot is secured. The swivel foot includes a foot pad 18 having a flat bottom surface and a threaded portion extending therefrom which includes a concave semi-circular end that fits around the spherical member 17. The foot portion 18 is held in place on the spherical member at the base of the stem with a locking cap 21 which screw threads onto the threaded portion of the foot pad. The swivel foot on each of the threaded stems is movable on the spherical end of the threaded stem such that the flat surface will rotate to be secured to a non-flat surface. The frame is also provided with an aperture 22 therein within which a light bulb 20 and socket is placed for projecting light through the frame onto the surface in which a hole is to be bored. A cylindrical tubular barrel or guide 23 having bearing surfaces 24 on the inside thereof and a rib or shoulder 25 on the outside thereof is inserted into the frame. The rib portion on the outside of the barrel is provided with oppositely disposed flat surfaces 26, 90 degrees apart, the purpose of which will be explained later. The outer surface of the tubular barrel is provided with threads 27 thereon along a portion thereof extending away from the rib 25. The barrel or guide fits within the frame 12 with the threaded end extending outwardly therefrom such that the rib 25 rests upon the rim 13 on the frame. A cylindrical coupling member 28, L-shaped in cross section, has an axially extending portion 31 having threads on the inside thereof that mate with the external threads on the rim 13 of the frame. The inwardly extending portion 32 of the coupling extends inwardly over the rib 25 on the barrel and secures the barrel in place relative to the frame 12. The portion 31 of the coupling member is provided with two pair of oppositely disposed screw threaded apertures 33 within which adjusting screws 34, 34a are threaded. The adjusting screws are provided with a head 35 for the purpose of easily adjusting each of the adjusting screws. The adjusting screws are better shown in FIG. 3. The coupling member screw threads down over the rib on the barrel such that the barrel has a loose fit and is movable in a radial plane relative to the frame or is secured in place against movement. The adjusting screws 34 and 34a may be moved inwardly or outwardly in order to adjust the barrel with respect to the axis of the frame 12. A substantially wide lock ring 36 screw threads onto the threaded portion of the barrel and has an inner end which rest against the inwardly extending portion 32 of the coupling in order to lock the coupling in position and to hold the barrel in place. A lock ring 37 is provided to positively lock the lock ring 36 in place. Therefore the ring 37 prevents the lock ring 36 from moving relative to the inwardly extending portion 32 of the coupling member 28. A V-groove 38 is machined into the upper surface of the coupling member such that the outer axially extending surface of the ring 36 when in alignment with the edges of the groove indicates that the barrel is coaxial with the frame. If the axially extending outer surface of lock ring 36 is slightly over the edge of the groove it indicates the barrel is not axially aligned with the frame member.

On assembly, the frame 12 is made as described with the rim 13 having threads on the outer surface thereof and the threaded members for adjusting the swivel feet are screw threaded into the radially extending arms and the spherical knob 17 and the foot pads 18 are secured thereon. The previously formed barrel 23 is set into the frame with the outer threaded surface extending upwardly away from the frame. The coupling member 28 is placed over the shoulder 25 of the barrel and screw threaded onto the threaded rib 13 with the barrel in axial alignment with the frame. The lock ring 36 is then threaded onto the barrel unit such that the bottom portion of lock ring rests upon the upper portion 32 of the coupling member. Lock ring 37 is then threaded over the barrel and secured tightly against the lock ring 36 in order to hold lock ring 36 in place. The adjusting screws 34, 34a for the fine lateral adjustment of barrel positions are then threaded into the apertures within the coupling member or they are threaded therein before the coupling member is screw threaded onto the rib 13. Also the lock-screws 19 may be threaded into the radially extending arms before or after the threaded stem 15 is screw threaded therein.

The cylindrical shoulder or rib 25 on the barrel provides a cross-slide which enables one to have fine lateral adjustment of the barrel position relative to the frame necessary for precisely aligning the barrel axis with the proposed hole center. When adjusting the barrel relative to the frame for example adjustment screws 34 will be used for moving the barrel, as one screw 34 is moving outwardly the opposite screw 34 is moved inwardly thereby moving the barrel along adjustment screws 34a which act as guides. Likewise with adjustment screws 34 stationary and one screw 34a being screw threaded outwardly and the opposite screw 34a being screw threaded inwardly, the barrel will be moved in a direction along the axis of adjustment screws 34a which will be guided by the inward ends of adjustment screws 34. For a precise fine lateral adjustment of the barrel position it may be necessary to adjust each of the sets of screws 34 and 34a in order to properly align the center of the barrel with the proposed hole center.

In operation, the device is assembled and the barrel is adjusted visually for coaxial alignment with the frame by use of the concentric V-groove on the coupling member. The device is now ready for securing the device to the surface within which the hole is to be bored. For instance, the device may be used for accurately boring a hole for determining stress in a surface such as by use of the method set forth in application Ser. No. 330,208 filed Dec. 13, 1963, now Patent No. 3,336,834. Assuming that the desired position for boring the hole within the surface has been indicated on the surface and that the photoelastic material set forth in the above patented method has been secured to the surface and is ready for boring the hole through the photo stress material and into the surface, the device is in position for alignment and boring the hole. For the purpose of accurately securing the device to the surface within which the hole is to be bored, a microscope such as a Gaertner Microscope, model M101 is used within the barrel to align the device and to mark the spot on the surface at which the feet will be secured. Since the device is secured to the surface by any suitable cement the surface must be prepared and the cement applied to the surface and/or the swivel feet of the device. The device is secured with the feet at the spots so indicated by the suitable cement on the feet while visually looking through the microscope within the barrel for a rough alignment with the center of the barrel. The cross hairs of the microscope are in alignment with the axis of the barrel and therefore will be positioned over the point within which the hole must be bored. Once the device has been secured to the surface within which the hole is to be bored, precise adjustment of the barrel with respect to the hole to be bored is then brought about by use of the microscope and the barrel adjustment screws 34 and 34a.

It has been noted heretofore that the frame was provided with an aperture 22 therein within which a light socket and light is secured, this light is used to reflect light onto the surface for adjustment of the device. The microscope when inserted in the barrel, supplies the operator with a magnified view of the work area. The center section of the scope cross hairs serves to identify the center of the barrel axis. The microscope is focused by slipping the microscope up or down in the barrel and is held in position by setting an adjustable collar on the microscope to bear against the end of the barrel which is formed normal to the axis of the barrel. Cross hair alignment with the axis of the barrel may be checked by rotating the scope in the barrel and taking note of the position of the cross hair section with respect to a point on the work suface.

Since the swivel feet are secured to the frame by use of threaded stems the threaded stems are used to adjust the barrel such that the barrel is normal to the surface within which the hole is to be bored. The swivel foot pads will automatically swing to a position of maximum surface contact when the device is secured in position and the barrel axis will be aligned normal to the surface which is to be milled by adjustment of the screw threaded stems. Once the device has been secured to the surface within which the hole is to be bored and the cement has properly set, the device is then ready for fine adjustment. Fine adjustment of the barrel is carried out by use of the adjusting screws 34 and 34a, as set forth above. Adjustment of the barrel is carried out by visually observing the spot in which the hole is to be bored through the microscope within the barrel. Once the fine adjustment has been brought about, the microscope is then removed from the barrel and the device for boring a hole is then inserted into the barrel and the hole is bored. It is to be noted that the device which is to bore the hole will have the bit which bores the hole axially aligned with the axis of the barrel and the device will be such that it will fit within the barrel for axial movement therein. Thus the accurate alignment by use of the microscope and the boring device being of such a nature that it will axially align with the barrel will form a hole in the surface to which the device is secured at the precise desired point.

Figure 4:
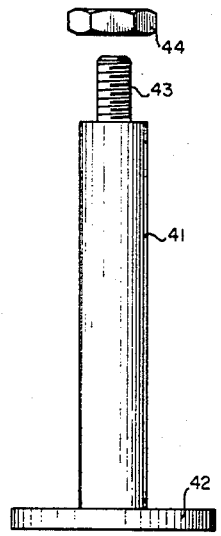
FIG. 4 illustrates an accessory for setting the feet of the device in the same plane.

In use, it is generally desirable to have the axis of the instrument set normal to the surface to be milled or within which a hole is to be bored, this condition may be attained through a vertical adjustment of the swivel feet, however, a means of checking the axial position of the barrel must be available. For this purpose three different alignment units will be described herein for this purpose. The selection of a particular unit will depend upon the type of surface curvature in which the hole is to be bored. For a flat surface the swivel feet must be in a plane perpendicular to the axis of the frame and barrel. A device such as shown in FIG. 4 may be used for positioning the swivel feet in such a plane.

The swivel foot alignment tool has a cylindrical body 41 of substantially the same outer diameter as the inner diameter of the barrel and is provided with a head 42 which has a diameter greater than or equal to a circle about the swivel feet. The upper end 43 of the swivel foot alignment tool is provided with screw threads to which a threaded collar 44 or nut having a greater diameter than the barrel may be secured. In order to adjust the swivel feet correctly, for smooth surface, the swivel foot alignment tool is inserted into the barrel from the bottom of the instrument. It is pushed upward until its head 42 contacts one or more of the swivel foot pads. The tool is secured in this position with the nut screw threaded onto the upper end against the upper end of the barrel. The remaining foot or feet are then adjusted vertically downward against the head of the swivel foot alignment tool. When all of the foot pads lie in the same plane which is normal to the barrel axis, the swivel feet vertical adjustments are locked in place by use of the set screws. The tool is then removed from the barrel once the above adjustments have been completed.

The device is now ready to be secured to a flat surface wherein the barrel axis will be normal to the surface since the swivel feet have been adjusted in a plane normal to the axis.

Heretofore, it has been stated that the barrel must be normal to the surface in which the hole is to be bored; therefore, on curved surfaces this requires a special arrangement for this purpose. FIG. 5 illustrates a tool which may be used with the device set forth above for aligning the barrel normal to the surface on the curved surface. As shown, the cylindrical curvature alignment tool 45 includes a center cylindrical section 46 having flat rounded end connectors 47 and 48 which are connected by a screw and wing nut 53 to end connectors 51 and 52 of end sections 54 and 55. End section 54 is of cylindrical configuration having an outer diameter substantially the same as the inner diameter of the bearing surfaces on the barrel for a close fit within the barrel of the hole-locating device. The end of section 54 is provided with a shoulder 57 which rides on the outer end of the barrel of the device when in use. The end 55 is cylindrical and has secured on the outer end thereof a sharp pointed end 56 by any suitable means. The device is secured together with the end connections joined such that the joined ends may be moved relative to each other by loosening the wing nut and then the sections will be held in place by tighting the wing nuts.

Assuming that the precision hole locating and milling guide is to be secured to a regular curved surface such that a hole is to be bored in the surface, the following steps may be used. The swivel feet of the instrument should first be placed in their optimum position with a swivel foot alignment tool 41 as described previously. A circle is scribed on the cylindrical work surface, with a compass or other suitable means, concentric with the proposed hole center and having a diameter equal to the diameter of a circle formed by the swivel feet on the device. A surface line is then drawn through the hole center to intersect the scribed circle at two opposed diametrical points. This line must be in a plane which is normal to the axis of cylindrical curvature of the surface. The hole-locating device is then set upon the curved surface in a manner which will require the additional adjustment of one more of its swivel feet. Insert the microscope within the barrel of the hole-locating device and place the device over the hole center with the axis of one of its swivel feet directly over the cylindrical element line. This foot is then adjusted downward with an occasional check on the instrument position until visual approximation of axial alignment is reached. Then the swivel feet are secured in position. The microscope is then withdrawn from the barrel and the cylindrical curvature alignment tool is inserted with end section 54 inserted into the barrel of the tool while being held in place on the surface. The shoulder 57 of end connection 51 rests on the upper end of the barrel and the instrument is rotatable around the barrel by hand motion. The joints or end connections of the cylindrical curvature alignment tool should be set with sufficient friction to hold the tool point to any adjusted position. The tool is adjusted until its index point 56 just touches the intersection of the line and circle on the curved surface. The tool is then rotated through a 180 degrees to check the position of its point with the other line and circle intersection. If the tool does not touch the second intersection the instrument swivel foot must be adjusted. The procedure is repeated moving the cylindrical curvature alignment tool to a 180 degrees with the tool point touching the surface at the intersection of the line and the circle on opposite sides of the instrument and adjusting the feet each time vertically until the tool point just touches the surface on each side of the instrument. The feet are adjusted for each of the diametrically opposite points on the circle and line until the point of the cylindrical curvature alignment tool just touches the surface at each of the designated points.

Figure 7:
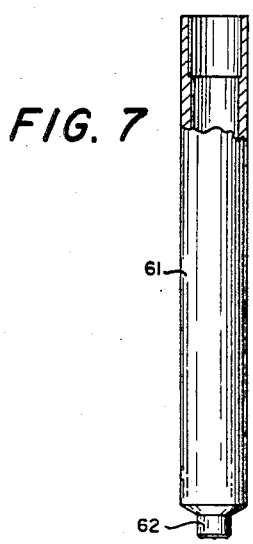
FIG. 7 illustrates an accessory for aligning the device normal with an irregular surface.
Figure 8:
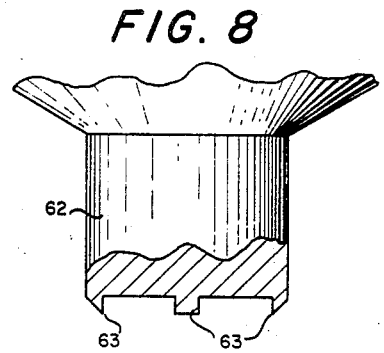
FIG. 8 illustrates in detail the small end of the device of FIG. 7.

For irregular curvature of the surfaces an irregular curvature alignment tool may be used. Such a tool is shown by FIG. 7 and is made of a cylindrical body 61 which may be inserted into the barrel of the hole-locating device and which is provided with a small cylindrical end 62. The small end portion 62 has four curved knife edges 63 which are ground into the end surface at 90 degree intervals wherein the end surface may be circular and of about ⅛ inch diameter. The small circular end portion 62 is concentric to the axis of the tool and the curved knife edges lie in a plane which is normal to the axis of the tool. Thus, when the irregular curvature alignment tool is inserted within the barrel of the hole-locating device the knife edges are in a plane normal to the axis of the barrel.

In making use of the irregular curvature alignment tool the small area of the work surface located about the proposed hole center is polished and "blued" with a marker fluid. The microscope is then inserted into the barrel to position the instrument over the hole center with its axis approximately normal to the surface at the hole center. The instrument foot pads having been set at their optimum positoin are cemented in place. The microscope is then removed from the barrel and the irregular curvature tool is then inserted into the barrel in place of the microscope and the tool points are brought to bear gently against the work surface. A slight angular rotation of the tool (5 degrees or less) serves to mark the "blued" work surface. The marked surface is next observed with the microscope. If only one of the tool points has scribed the surface, the side of the instrument across the center of the hole from the scribe point is lowered by the vertical adjustment of the swivel foot. The tool is then used to remark the surface and the marks are again examined with the microscope. This process is repeated until four scribe marks appear on the work surface at which time the instrument axial alignment has been achieved and the hole locating device is properly aligned for drilling of the hole.

Because of the need to adapt the instrument to a number of usages and working conditions, a wide variety of adjustments and procedures are included with the use of additional instruments. In order to simplify the operation of the instrument, two preliminary steps are observed. This preliminary procedure will produce an optimum starting position from which other necessary adjustments can be accomplished with ease.

The optimum starting position is reached when the barrel has been adjusted to the center of the frame and the swivel feet have been placed in a plane which is normal to the instrument axis, both of these adjustments are simple and relatively easily preformed to center the barrel in the frame, as shown by FIG. 1, first release lock ring 37 and lock ring 36 and adjust the cross slide of the barrel utnil lock ring 36 is centered within the V-groove 30 which has been cut into the top of the coupling 32. The barrel is now centered coaxial with the frame by adjustment of the adjusting screws 34 and 34a. The lock rings and adjusting screws are left in this position for future precision adjustment when aligning the barrel over the hole to be drilled. The swivel feet are placed in optimum starting position by inserting the swivel foot alignment tool into the barrel through the bottom of the instrument and adjusting the feet vertically until all pads contact the flange of the swivel foot alignment tool. Again all screw adjustments should be left in operating position such that they may be further adjusted depending on the surface within which the work is to be performed.

The selection of a working procedure is governed by the work conditions, namely by the curvature of the work surface and by the hole specification. If the surface is flat or spherical, adjustment of the instrument to its optimum starting position makes it ready for mounting on the work and for use on this type of surface the lock rings and swivel lock screws must be secured in place. If the surface is cylindrical, a further adjustment is necessary with the cylindrical alignment tool as shown in FIG. 5. Finally, if the surface is completely irregular, the irregular curvature alignment tool as shown in FIG. 7 should be used. Alignment of the hole-locating device by use of the alignment tools is carried out as set forth above.

The hole-locating instrument mounting procedure is as follows: After selection of the work surface and indicating the spot within which a hole is to be bored, the instrument is roughly centered and aligned on the work surface with the aid of the microscope. With the instrument held manually in position, the foot pad locations are marked on the surface with a scribe or by any other means. The indicated foot upon which the instrument is to be mounted is cleaned by any suitable solvent such as alcohol, methyl ethyl ketone, or any other such cleaning solutions. The solvent residue is cleaned or wiped away, subsequent thereto, a neutralizer is applied to insure that the surface is cleaned. The areas are now ready for application of cement for securing the foot pads of the swivel feet of the device. A suitable cement for this purpose has been found to be Dura-Kore dental cement (Reliance Dental Manufacturing Company). Such cement has been found to reach full strength in about ten minutes; therefore, the instrument may be used within ten minutes after application of the cement.

With the instrument cemented into position, the final precise adjustment of the barrel position and alignment are made by means of insertion of the microscope into the barrel by visually observing the cross hairs and by adjustment of the vertical swivel foot screws and/or the adjusting screws for the barrel. Once the barrel of the instrument has been properly aligned all screw adjustments are locked in position and the instrument barrel is ready for use as a rigidly mounted drilling or hole milling guide. Once the desired hole has been drilled, the device may be removed without damage to the surface due to mounting of the device.

The description of the device has been set forth heretofore for boring small holes into a surface, it is to be noted that the device may be used for centering large diameter holes. Large diameter holes can be produced by first employing the precision milling guide to locate and mill or drill a pilot hole for a piloted counter-bore. With the instrument removed the counterbore is then used to enlarge the hole to the desired size by any well known hole cutting instrument. Thus, the hole-locating instrument as set forth herein may be used for drilling holes of any desired diameter. The device has been used to drill holes as small as about 0.059 inch in diameter and by use of the instrument for locating and milling a hole in combination with a counterbore the device may be used for centering holes of any diameter.

The device has been described and shown using three equiangularly spaced swivel feet about the axis of the frame; however, it would be obvious to one skilled in the art that any number of feet may be used as well as making use of an axillary foot off to one side of the axis such that the swivel foot will not interfere with work on one side. It is noted by use of an axillary swivel foot that the hole above which the device is secured to the surface would be to one side of the center of the instrument.

Although the invention has been described with a certain degree of particularity, it is obvious that many modifications or advantages will be apparent to those skilled in the art and it should be understood that the appended claims will cover all such modifications and advantages which fall within the scope of the invention.

What is claimed and desired to be secured by Letters Patent of the United States is:

1. A portable-precision hole locating and milling guide which comprises:
   a tubular frame,
   a threaded rim on one end of said frame,
   a plurality of radial arms extending from the opposite end of said frame,
   a swivel foot secured one each to each of said plurality of arms for supporting said frame, on a surface within which a hole is to be bored.
   a tubular barrel member,
   said tubular barrel including a circular shoulder thereon and a threaded section on the outer surface between the shoulder and one end,
   said tubular member extending into said frame with the shoulder thereon resting on the threaded rim end of said frame with the threaded section of said tubular member being above said shoulder,
   means for securing said tubular member to said frame for adjustment relative thereto and
   means for adjusting said tubular member for movement along lines in a plane normal to the linear axis of said frame, 2. A hole locating and milling guide as claimed in claim 1, wherein:
said adjustment means includes equiangularly spaced movable pins.

3. A hole-locating and milling guide as claimed in claim 2; which includes,
means for adjusting said swivel feet relative to said frame.

4. A hole locating and milling guide as claimed in claim 3; in which
lock rings are screw threaded onto said barrel for locking said barrel in position relative to said frame.

5. A hole locating and milling guide as claimed in claim 4; which includes,
means for visually aligning said barrel concentric with said frame.

6. A hole locating milling guide as claimed in claim 5 wherein,
said cylindrical shoulder on said barrel includes flat surfaces on the outer surface thereof equiangularly spaced about said surface and positioned opposite said equiangularly spaced movable pins.

7. A hole locating and milling guide as claimed in claim 6, in which;
said frame includes an aperture therein near the base thereof and
a light is secured within said aperture to illuminate the surface area below said device where positioned onto a surface to be worked.

References Cited

UNITED STATES PATENTS

| | | | |
|---|---|---|---|
| 1,749,980 | 3/1930 | Loeser | 33—181 |
| 2,661,653 | 12/1953 | Castiglia | 33—46.2 |
| 2,742,705 | 4/1956 | Gelardi | 33—137 |
| 2,818,655 | 1/1958 | de Gaston | 33—189 |
| 2,996,936 | 8/1961 | Blaise | 77—62 |
| 3,230,631 | 1/1966 | Skidmore | 33—189 |

WILLIAM D. MARTIN JR., Primary Examiner

U.S. Cl. X.R.

33—46, 189